US00RE44060E

(19) United States
(12) Reissued Patent
Hirai

(10) Patent Number: US RE44,060 E
(45) Date of Reissued Patent: Mar. 12, 2013

(54) ELECTRIC CAR CONTROL APPARATUS

(75) Inventor: Takatomi Hirai, Tokyo (JP)

(73) Assignee: Mitsubishi Electric Corporation, Chiyoda-Ku, Tokyo (JP)

(21) Appl. No.: 13/426,873

(22) Filed: Mar. 22, 2012

Related U.S. Patent Documents

Reissue of:
(64) Patent No.: 7,683,558
Issued: Mar. 23, 2010
Appl. No.: 11/658,540
PCT Filed: Apr. 7, 2005
PCT No.: PCT/JP2005/006880
§ 371 (c)(1),
(2), (4) Date: Jan. 25, 2007
PCT Pub. No.: WO2006/048955
PCT Pub. Date: May 11, 2006

(30) Foreign Application Priority Data

Nov. 5, 2004 (JP) ..... P2004-322397

(51) Int. Cl.
*H02P 3/14* (2006.01)
(52) U.S. Cl. ..... 318/376; 318/66; 318/371
(58) Field of Classification Search ..... 318/376, 318/371, 66, 432, 433, 434; 337/180; 701/22; 307/146
See application file for complete search history.

(56) References Cited

U.S. PATENT DOCUMENTS

2007/0163821 A1* 7/2007 Ogata ..... 180/65.2
2008/0004760 A1 1/2008 Sogihara

FOREIGN PATENT DOCUMENTS

| | | | |
|---|---|---|---|
| JP | 59-002501 | A | 1/1984 |
| JP | 59-2501 | A | 1/1984 |
| JP | 61-221577 | A | 10/1986 |
| JP | 63-080701 | A | 4/1988 |
| JP | 63-80701 | A | 4/1988 |
| JP | 6-189411 | A | 7/1994 |
| JP | 06-189411 | A | 7/1994 |
| JP | 9-65507 | A | 3/1997 |
| JP | 09-065507 | A | 3/1997 |
| JP | 11-155204 | A | 6/1999 |
| JP | 11-215601 | A | 8/1999 |

OTHER PUBLICATIONS

English translation of Official Action issued in priority JP Patent Application No. 2004-322397, Aug. 7, 2007, 2 pages.

* cited by examiner

*Primary Examiner* — Karen Masih
(74) *Attorney, Agent, or Firm* — Buchanan Ingersoll & Rooney PC

(57) ABSTRACT

An electric car control apparatus with which it is possible to make the size of equipment small.
The control apparatus includes current detectors for respectively detecting currents flowing through collector shoes mounted on a leading car; a no-current indicator for outputting a no-current signal when the currents detected by these current detectors are zero; a no-current train line for transmitting the no-current signal to the following car; and disconnection timer mounted on each of the cars for, when inputting a speed signal and a no-current signal, in correspondence with the speed of the cars outputting a disconnection signal for causing a connector to disconnect after a predetermined time such that it is possible to determine that there is a dead section or gap.

2 Claims, 3 Drawing Sheets

ELECTRIC CAR CONTROL APPARATUS

Matter enclosed in heavy brackets [ ] appears in the original patent but forms no part of this reissue specification; matter printed in italics indicates the additions made by reissue.

TECHNICAL FIELD

This invention relates to an electric car control apparatus of an electric car that collects electricity from a third rail in an underground railway or the like.

BACKGROUND ART

In an electric car control apparatus of related art, for each car of a train made up of multiple cars, d.c. electrical power at a d.c. voltage of 600V or 750V is taken in from a third rail through a collector shoe and a countercurrent blocking diode, and the cars are connected to each other by a high-voltage train line (see for example Patent Document 1).

Patent Document 1: JP-A-11-215601 (Page 3, FIG. 1)

DISCLOSURE OF THE INVENTION

Problems that the Invention Seeks to Solve

In an electric car control apparatus of related art, while a car is passing a power-cut section or a dead section (gap) for carrying out maintenance work on the side of ground, a regenerated voltage from drive control means such as an inverter or a capacitor voltage is prevented from being impressed on the third rail of the power-cut section by means of a countercurrent blocking diode. And, because d.c. electrical power taken in from the third rail via a collector shoe and the countercurrent blocking diode is supplied to car drive motors, the countercurrent blocking diode is a large-capacity one. Consequently, there has been the problem point that a countercurrent blocking diode and a cooling fin for cooling the countercurrent blocking diode are necessary and the equipment is large.

This invention was made to solve problem points of the kind mentioned above, and has the object of providing an electric car control apparatus with which it is possible to make the equipment small.

Means for Solving the Problems

An electric car control apparatus according to a first aspect of the invention is an electric car control apparatus that, with at least one car as an object, from a third rail in which a dead section of a predetermined length at no voltage is provided, collects d.c. electrical power with a collector shoe disposed on the car, supplies the d.c. electrical power to drive control means mounted on the car, and controls car drive motors with the drive control means, the electric car control apparatus includes connecting/disconnecting means, speed detecting means, current detecting means, no-current detecting means, and disconnection time setting means. The connecting/disconnecting means connects and disconnects the collector shoe and the drive control means. The speed detecting means detects the speed of the car and outputting a speed signal. The current detecting means detects the current flowing through the collector shoe. The no-current detecting means outputs a no-current signal when the current that the current detecting means detects is zero. The disconnection time setting means, when the speed signal and the no-current signal are inputted, after a predetermined time outputs a disconnection signal for causing the connecting/disconnecting means to disconnect.

An electric car control apparatus according to a second aspect of the invention is an electric car control apparatus that, with at least two cars coupled to each other as an object, from a third rail in which a dead section of a predetermined length at no voltage is provided, collects d.c. electrical power with collector shoes disposed on each of the cars, supplies the d.c. electrical power to a main circuit train line connecting the cars, supplies the d.c. electrical power from the main circuit train line to drive control means mounted on each of the cars, and controls car drive motors with the respective drive control means, the electric car control apparatus includes connecting/disconnecting means, speed detecting means, current detecting means, no-current detecting means, a no-current signal train line, and disconnection time setting means. The connecting/disconnecting means connects and disconnects the main circuit train line and the drive control means of the respective cars. The speed detecting means detects the speed of the cars and outputting a speed signal. The current detecting means detects the current flowing through the collector shoe mounted on the leading car among the cars. The no-current detecting means, when the current that the current detecting means detects is zero, outputs a no-current signal. The no-current signal train line transmits the no-current signal to the following car. The disconnection time setting means is mounted on each of the cars for, when the speed signal and the no-current signal are inputted, after a predetermined time outputting a disconnection signal for causing the respective connecting/disconnecting means to disconnect.

An electric car control apparatus according to a third aspect of the invention is an electric car control apparatus that, with at least two cars coupled to each other as an object, from a third rail in which a dead section of a predetermined length at no voltage is provided, collects d.c. electrical power with collector shoes disposed on each of the cars, supplies the d.c. electric power to drive control means mounted on each of the cars, and controls car drive motors with the respective drive control means, the electric car control apparatus includes connecting/disconnecting means, speed detecting means, current detecting means, no-current detecting means, and disconnection time setting means. The connecting/disconnecting means connects and disconnects the collector shoes and the drive control means of the respective cars. The speed detecting means detects the speed of the leading car among the cars and outputting a speed signal. The current detecting means detects the current flowing through the collector shoe mounted on the leading car. The no-current detecting means, when the current that the current detecting means detects is zero, outputs a no-current signal. The disconnection time setting means is mounted on the leading car for, when the speed signal and the no-current signal are inputted, after a predetermined time outputting a disconnection signal for causing the connecting/disconnecting means to disconnect. The disconnection signal train line transmits the disconnection signal to the connecting/disconnecting means of the following car among the cars.

Effects of the Invention

In an electric car control apparatus according to the first, second, third aspect of the invention, the equipment can be made small by a construction being adopted wherein when a no-current signal outputted when the current flowing through the collector shoe is zero and the speed signal of the car are inputted to disconnection time setting means, after a predetermined time a disconnection signal is outputted and connecting/disconnecting means is caused to disconnect, the drive control means is cut off from the collector shoe, and a regenerated voltage from the drive control means or a capacitor voltage are prevented from being impressed on the third rail of a power-cut section.

BEST MODES FOR CARRYING OUT THE INVENTION

EMBODIMENT 1

Figure 1:
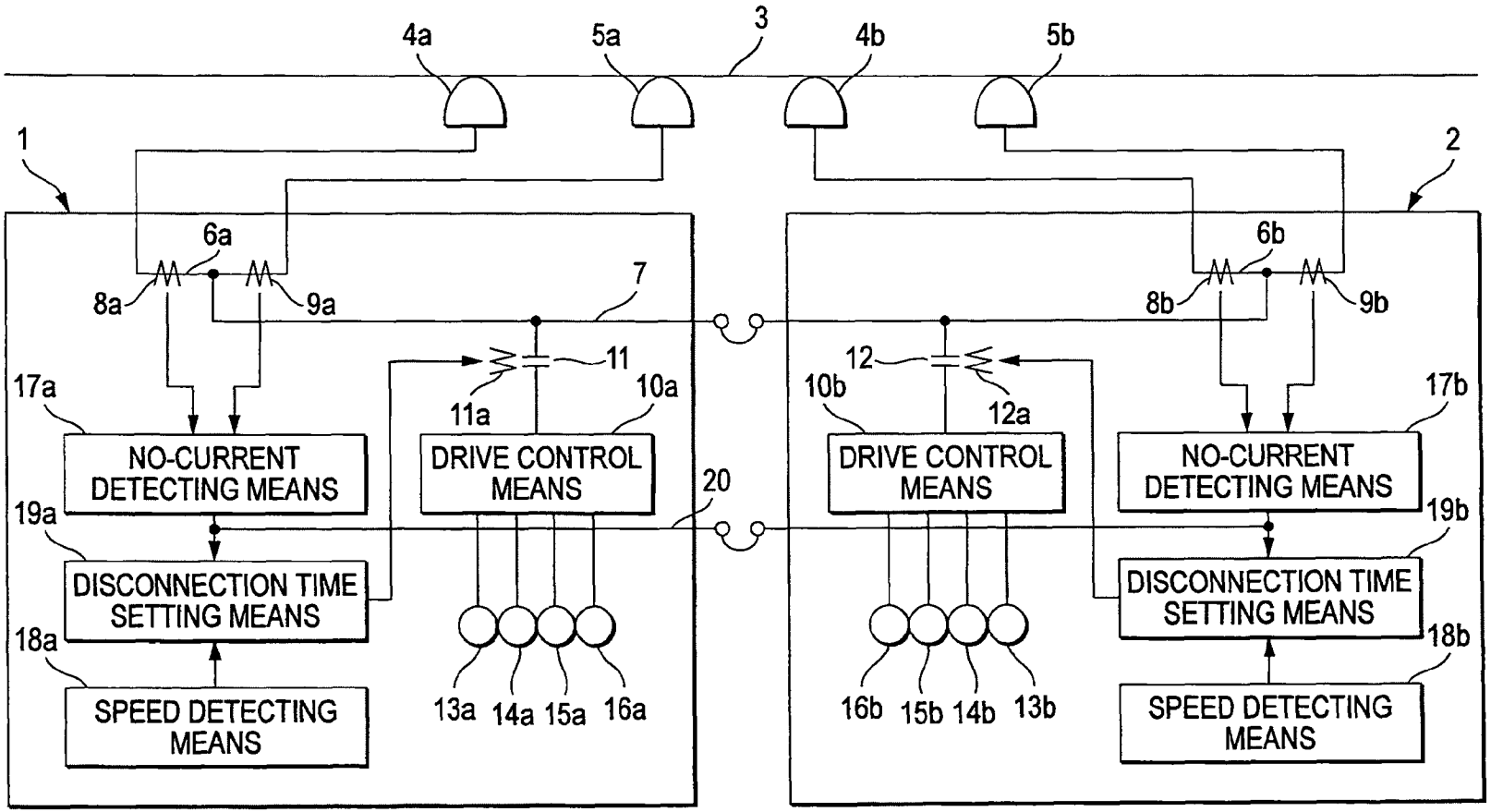
FIG. 1 is a construction view of an electric car control apparatus in an Embodiment 1 for working the invention.

FIG. 1 is a construction view of an Embodiment 1 of an electric car control apparatus according to this invention. In FIG. 1, cars 1, 2 coupled to each other collect d.c. electrical power from a steel third rail 3 installed on ground by means of collector shoes 4a, 5a, 4b, 5b. 600V or 750V d.c. electrical power is supplied to the third rail 3 from a transformer substation (not shown). And, the collector shoes 4a, 5a are disposed respectively at the front and rear of the car 1 and the collector shoes 4b, 5b are disposed respectively at the front and rear of the car 2. The collector shoes 4a, 5a are connected to each other by a connecting member 6a made of a conductor such as copper, and the collector shoes 4b, 5b are connected to each other by a connecting member 6b made of a conductor such as copper. Also, the conductors 6a, 6b are connected to each other by a main circuit train line 7 running between the cars 1, 2. In the car 1, current detecting means 8a is disposed between the collector shoe 4a and the main circuit train line 7 and detects the current flowing through the collector shoe 4a, and current detecting means 9a is disposed between the collector shoe 5a and the main circuit train line 7 and detects the current flowing through the collector shoe 5a. And, in the car 2, current detecting means 8b is disposed between the collector shoe 4b and the main circuit train line 7 and detects the current flowing through the collector shoe 4b, and current detecting means 9b is disposed between the collector shoe 5b and the main circuit train line 7 and detects the current flowing through the collector shoe 5b.

Drive control means 10a such as an inverter mounted on the car 1 receives a supply of the d.c. electrical power from the main circuit train line 7 via connecting/disconnecting means 11 such as an electromagnetic contactor. And, drive control means 10b such as an inverter mounted on the car 2 receives a supply of the d.c. electrical power from the main circuit train line 7 via connecting/disconnecting means 12 such as an electromagnetic contactor. Control of car drive motors 13a, 14a, 15a, 16a, 13b, 14b, 15b, 16b of the cars 1, 2 is carried out with an a.c. electrical power converted in the drive control means 10a, 10b. The connecting/disconnecting means 11, 12 are constructed so that when coils 11a, 12a are excited, the drive control means 10a, 10b are connected to the main circuit train line 7.

When the detected currents of the current detecting means 8a, 9a inputted to no-current detecting means 17a mounted on the car 1 are zero, a no-current signal is outputted from the no-current detecting means 17a. When the no-current signal outputted from the no-current detecting means 17a, or a no-current signal outputted from a no-current detecting means 17b which will be further discussed later, and a speed signal outputted from speed detecting means 18a for detecting the speed of the car 1 are inputted to disconnection time setting means 19a, after a predetermined time the disconnection time setting means 19a outputs to the coil 11a a disconnection signal that causes the connecting/disconnecting means 11 to disconnect. The no-current signal outputted from the no-current detecting means 17a is transmitted to disconnection time setting means 19b on the car 2 side via a no-current train line 20.

On the other hand, when the detected currents of the current detecting means 8b, 9b inputted to no-current detecting means 17b mounted on the car 2 are zero, a no-current signal is outputted from the no-current detecting means 17b. When the no-current signal outputted from the no-current detecting means 17b, or a no-current signal outputted from the no-current detecting means 17a, and a speed signal outputted from speed detecting means 18b for detecting the speed of the car 2 are inputted to the disconnection time setting means 19b, after a predetermined time the disconnection time setting means 19b outputs to the coil 12a a disconnection signal that causes the connecting/disconnecting means 12 to disconnect. The no-current signal outputted from the no-current detecting means 17b is transmitted to the disconnection time setting means 19a on the car 1 side via the no-current train line 20.

The operation of an electric car control apparatus constructed as shown in FIG. 1 in a case where the cars 1, 2 are running in the leftward direction in the figure and the transformer substation (not shown) is on the rear side of the cars 1, 2 will now be explained.

First, d.c. electrical power is collected from the third rail 3 by the collector shoes 4a, 5a, 4b, 5b. In this case, because due to a difference in the resistance values of the steel third rail 3 and the main circuit train line 7 made of copper or the like, the branch current ratios differ, the current flowing through the collector shoe 5b is the largest, but electricity is also collected through the other collector shoes 4a, 5a, 4b, and currents flow through them. And, the connecting/disconnecting means 11, 12 have their coils 11a, 12a being excited and are closed. Accordingly, drive control of the car drive motors 13a to 16a and 13b to 16b is carried out with the a.c. electrical power converted by the drive control means 10a, 10b.

In this kind of running state, because the detected currents of the current detecting means 8a, 9a, 8b, 9b are not zero, no-current signals are not outputted from the no-current detecting means 17a, 17b. Therefore, because neither of the coils 11a, 12a of the connecting/disconnecting means 11, 12 is being excited, the drive control means 10a, 10b are connected to the third rail 3 via the main circuit train line 7 and the collector shoes 4a, 5a, 4b, 5b.

Figure 2:
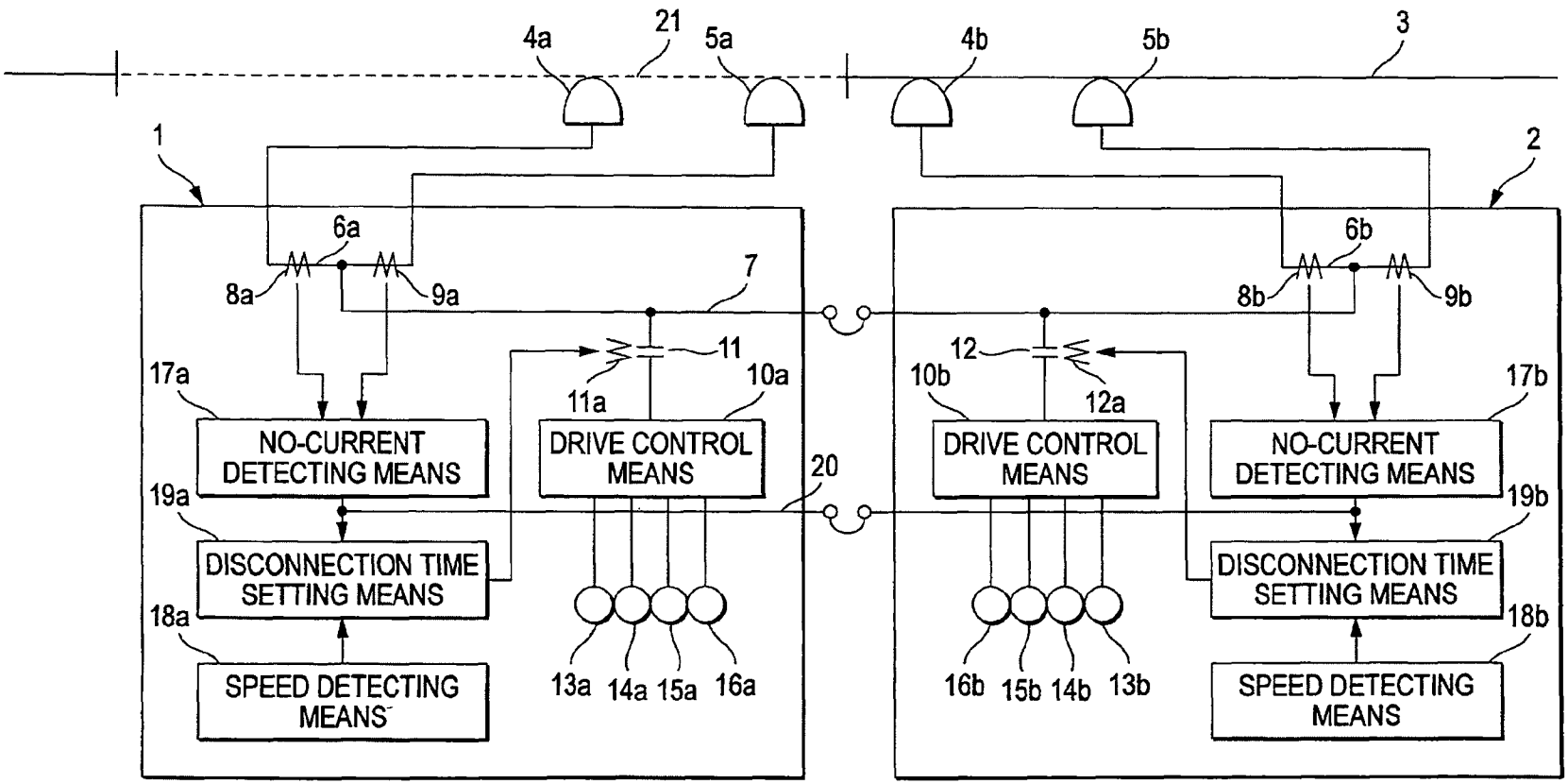
FIG. 2 is an explanatory view showing the state of a car having entered a gap.

Next, a state of the cars having entered a dead section or a gap will be explained. FIG. 2 is an explanatory view showing a state of having entered a dead section or a gap. In FIG. 2, the car 1 has entered a dead section or gap 21, and the car 2 is traveling in front of the dead section or gap 21 and has not entered the dead section or gap 21. In this case, because since the dead section or gap 21 has no voltage collection of the d.c. electrical power is not carried out through the collector shoes 4a, 5a of the car 1, the detected currents of the current detecting means 8a, 9a are zero, and on the basis of this, a no-current signal is outputted from the no-current detecting means 17a of the car 1. The no-current signal outputted from the no-current detecting means 17a of the car 1 is inputted to the disconnection time setting means 19a of the car 1 and the disconnection time setting means 19b of the car 2. At this time, because the car 2 has not entered the dead section or gap 21, collection of the d.c. electrical power is carried out through the collector shoes 4b, 5b and the d.c. electrical power is supplied to the drive control means 10a, 10b via the main circuit train line 7.

Because the speed signal from the speed detecting means 18a is being inputted to the disconnection time setting means 19a on the car 1 side, when the no-current signal from the no-current detecting means 17a is inputted, after a predetermined time a disconnection signal for causing the connecting/disconnecting means 11 to disconnect is outputted. The timing at which the disconnection signal is outputted is set to a time such that it is possible to exclude short gaps provided at points and the like and determine that it is the dead section or gap 21 provided for maintenance work or the like. Then, in the disconnection time setting means 19a, in correspondence with the length of the coupled cars 1, 2 with respect to the length of the dead section or gap 21 and the speed signal from the speed detecting means 18a as of when the dead section or gap 21 was detected, after a predetermined time such that it is possible to recognize a gap set for maintenance work or the like, a disconnection signal is outputted.

Here, when on the car 2 side the no-current signal from the no-current detecting means 17a on the car 1 side is transmitted to it via the no-current train line 20, as on the car 1 side the disconnection time setting means 19b on the car 2 side outputs a disconnection signal to the coil 12a so as to cause the connecting/disconnecting means 12 to disconnect at the same timing as the car 1 side.

Then, when the cars 1, 2 pass the dead section or gap 21, the voltage of the third rail 3 is detected with voltage detecting means (not shown) or the like, the coils 11a, 12a are excited, the connecting/disconnecting means 11, 12 both assume their connected state and the d.c. electrical power is supplied from the third rail 3 to the drive control means 10a, 10b. Thereafter, the cars 1, 2 are run in the state of FIG. 1.

As described above, when a no-current signal outputted from the no-current detecting means 17a of the leading car 1 and the speed signal of the car 1 detected by the speed detecting means 18a are inputted to the disconnection time setting means 19a, in correspondence with the speed of the car 1 the disconnection time setting means 19a outputs a disconnection signal after a predetermined time such that it is possible to determine that it is the dead section or gap 21 and causes the connecting/disconnecting means 11, 12 to disconnect, whereby the drive control means 10a, 10b are disconnected from the main circuit train line 7. Because by this means it is possible to prevent a regenerated voltage from the drive control means 10a, 10b or a capacitor voltage or the like from being impressed on the third rail 3 via the collector shoes 4a, 5a, 4b, 5b, the construction becomes simple and it is possible to make the equipment small.

Although in Embodiment 1 a train made up of two cars, cars 1 and 2, was described, the same effects can be expected with a train made up of three or more cars.

And, in Embodiment 1, in the case of single-car operation of car 1 only, where there are no main circuit train lines 7, 20, the drive control means 10a is disconnected from the main circuit train line 7 by the connecting/disconnecting means 11 being caused to disconnect by the disconnection time setting means 19a outputting a disconnection signal after a predetermined time such that it is possible to determine that it is the dead section or gap 21 in correspondence with the speed of the car 1. As it is possible to prevent a regenerated voltage from the drive control means 10a or a capacitor voltage or the like from being impressed on the third rail 3 via the collector shoes 4a, 5a by this means, the same effects can be expected.

And, although in Embodiment 1 an apparatus was described in which speed detecting means 18a, 18b were disposed on each of the cars 1, 2, even if it is detected on either one of the cars 1, 2 and transmitted to the other by wire or wirelessly or the like the same effects can be expected.

Also, although in Embodiment 1 an apparatus was described in which the no-current signal outputted from the no-current detecting means 17a on the car 1 side is transmitted to the disconnection time setting means 19b on the car 2 side, when the cars 1, 2 are advancing in the rightward direction shown in FIG. 1, the no-current signal outputted from the no-current detecting means 17b on the car 2 side is transmitted to the disconnection time setting means 19a on the car 1 side via the no-current train line 20.

EMBODIMENT 2

Figure 3:
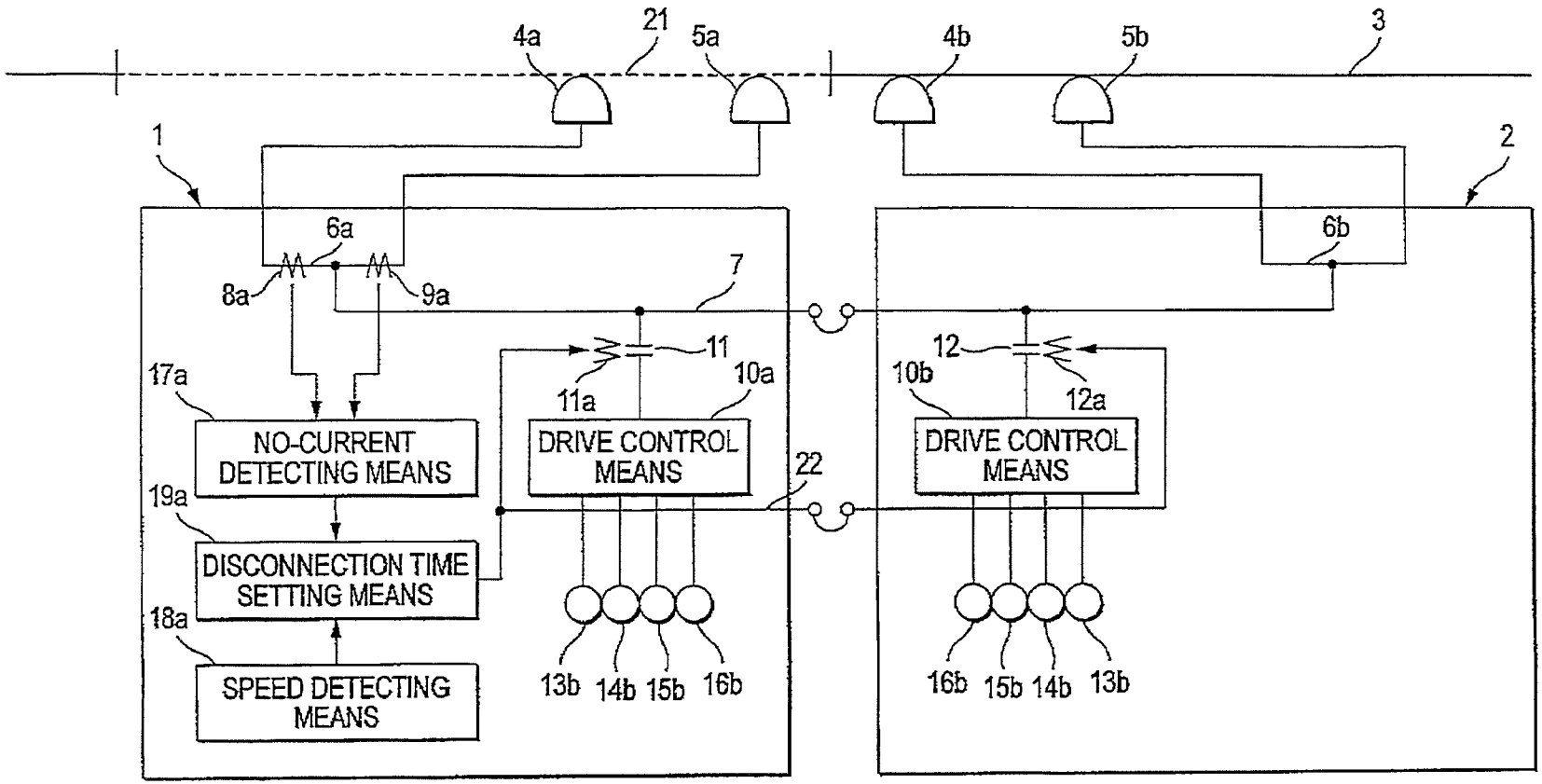
FIG. 3 is a construction view of an electric car control apparatus in an Embodiment 2 for working the invention.

FIG. 3 is a construction view of an Embodiment 2. In FIG. 3, parts with the same reference numerals are the same as in Embodiment 1. A disconnection signal outputted from the disconnection time setting means 19a is transmitted to the coil 12a of the connecting/disconnecting means 12 on the following car 2 side via a disconnection signal train line 22.

By this means, when the no-current signal outputted from the no-current detecting means 17a and the speed signal detected by the speed detecting means 18a are inputted to the disconnection time setting means 19a, the drive control means 10a, 10b are disconnected from the main circuit train line 7 by the disconnection time setting means 19a outputting a disconnection signal to the coils 11a, 12a after a predetermined time such that it is possible to determine that it is the dead section or gap 21 in correspondence with the speed of the car 1 and causing the connecting/disconnecting means 11, 12 to disconnect. Because in this way it is possible to prevent a regenerated voltage from the drive control means 10a, 10b or a capacitor voltage or the like from being impressed on the third rail 3 via the collector shoes 4a, 5a, 4b, 5b, the construction becomes simple and it is possible to make the equipment small.

The invention claimed is:

1. An electric car control apparatus that, with at least two cars coupled to each other as an object, from a third rail in which a dead section of a predetermined length at no voltage is provided, collects d.c. electrical power with at least one collector shoe disposed on each of the two cars, supplies the d.c. electrical power to a main circuit line connected between the two cars, supplies the d.c. electrical power from the main circuit line to drive control means mounted on each of the two cars, and controls car drive motors mounted on each of the two cars with the respective drive control means, comprising:

connecting/disconnecting means disposed on each of the two cars for connecting and disconnecting the main circuit line and the drive control means on each of the two cars;

speed detecting means for detecting the speed of [at least one car among] the [two] cars and outputting a speed signal;

current detecting means *disposed on at least the leading car among the two cars* for detecting the current flowing through the collector shoe on [at least] the leading [car among the two cars];

no-current detecting means for outputting a no-current signal when the current that the current detecting means detects is zero [on at least the leading car];

a no-current signal train line *disposed between the two cars* for transmitting the no-current signal [to the other car of the two cars]; and disconnection time setting means mounted on each of the two cars for, when the speed signal and the no-current signal are inputted, after a predetermined time *which is set to a time such that it is possible to recognize the dead section in correspondence with the speed of the car,* outputting a disconnection signal for causing the respective connecting/disconnecting means to disconnect, wherein when the no-current detecting means outputs the no-current signal, the no-current signal is supplied to the no-current signal train line, and the no-current signal is supplied to the [connecting/disconnecting] *disconnection time setting* means on each of the two cars.

2. An electric car control apparatus that, with at least two cars coupled to each other as an object, from a third rail in which a dead section of a predetermined length at no voltage is provided, collects d.c. electrical power with at least one collector shoe disposed on each of the two cars, supplies the d.c. electrical power to a main circuit line connected between the two cars, supplies the d.c. electrical power from the main circuit line to drive control means mounted on each of the two cars and controls car drive motors mounted on each of the two cars with the respective drive control means, comprising:

connecting/disconnecting means disposed on each of the two cars for connecting and disconnecting the main circuit line and the drive control means on each of the two cars;

speed detecting means for detecting the speed of [at least one car among] the [two] cars and outputting a speed signal;

current detecting means [disposed on the leading car among the two cars] for detecting the current flowing through the collector shoe on the leading car *among the two cars*;

no-current detecting means [disposed on the leading car] for, when the current that the current detecting means detects is zero, outputting a no-current signal;

disconnection time setting means mounted on the leading car for, when the speed signal and the no-current signal are inputted, after a predetermined time *which is set to a time such that it is possible to recognize the dead section in correspondence with the speed of the car,* outputting a disconnection signal [for causing the connecting/disconnecting means to disconnect on each of the two cars]; and a disconnection signal train line *disposed between the two cars* for transmitting the disconnection signal [from the leading car to the other car of the two cars], wherein when the disconnection time setting means outputs the disconnection signal, the disconnection signal is supplied to the disconnection signal train line, and the [disconnection signal is supplied to the connecting/disconnecting means on the other car] *connecting/disconnecting means on each of the two cars is disconnected.*

* * * * *